United States Patent Office 2,861,942
Patented Nov. 25, 1958

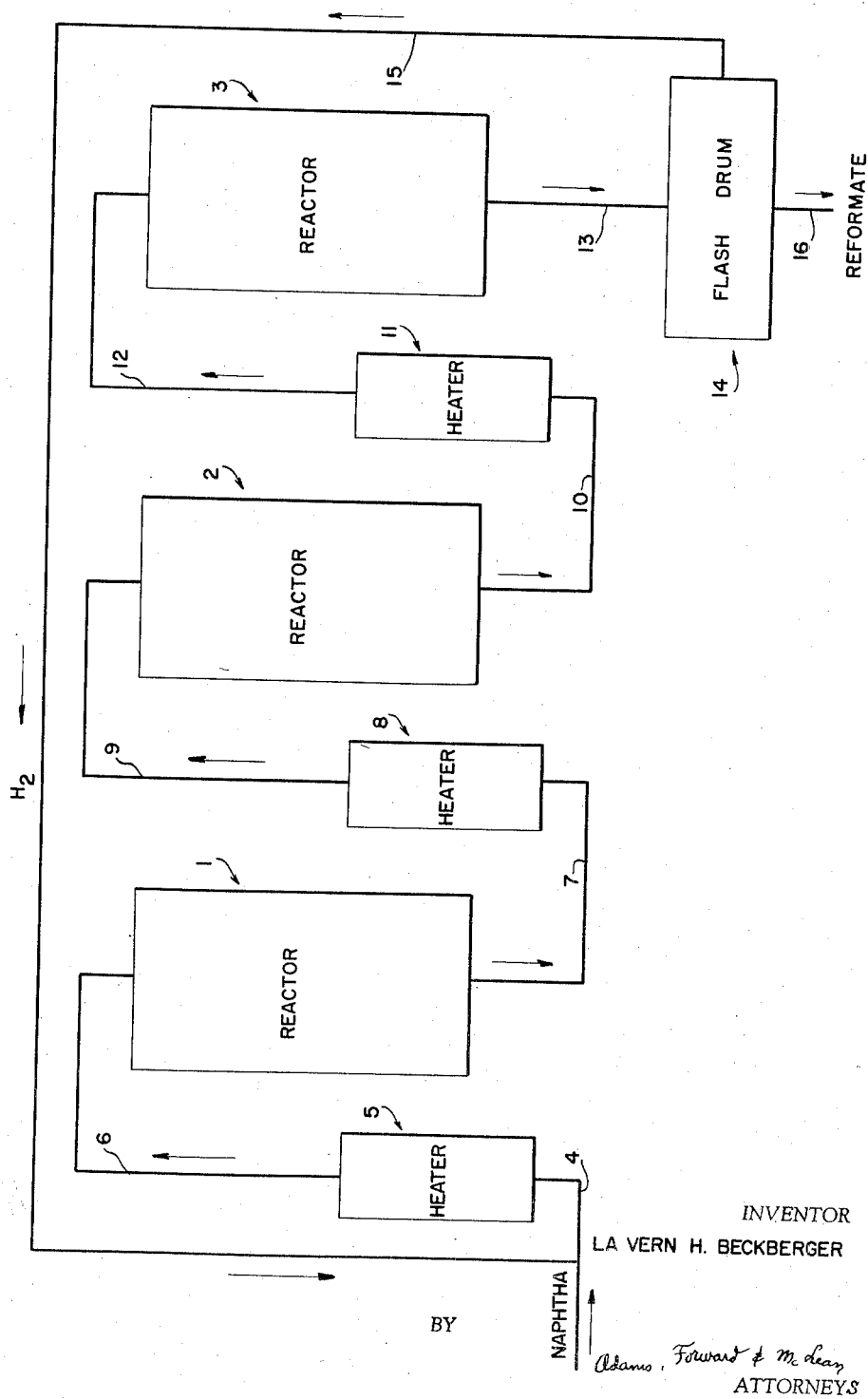

2,861,942

REFORMING IN MULTIPLE STAGES EMPLOYING A PLATINUM-TYPE METAL CATALYST

La Vern H. Beckberger, Harvey, Ill., assignor to Sinclair Refining Company, New York, N. Y., a corporation of Maine Application November 23, 1954, Serial No. 470,801

5 Claims. (Cl. 208—65)

This invention relates to the catalytic reforming of hydrocarbon fractions. More particularly my invention is concerned with the catalytic reforming in the presence of hydrogen of hydrocarbon fractions boiling in the gasoline and naphtha ranges in a multiple adiabatic catalyst bed conversion system employing platinum-type metal catalysts to improve the octane of the feed or for aromatics production.

Due to the endothermic nature of the catalytic reforming operation it has been considered desirable in the commercial scale reforming of gasoline and naphtha hydrocarbons in the presence of platinum metal catalysts to employ multiple adiabatic catalyst bed conversion systems. One method of operation involves holding the same inlet temperature to each catalyst bed, thus the fresh feed is preheated to the desired inlet temperature for the first reactor, the effluent from the first reactor is reheated to the same temperature and passed to the second reactor, and the same inlet temperature is obtained for subsequent reactors by reheating the effluent of each previous reactor. Regardless of the number of reactors employed, they each have the same inlet temperature effected by heating the charge before it enters the particular reactor. Since the reforming reaction continues over a substantial period of time the catalyst loses activity and consequently the octane number of the product decreases. To avoid the octane decrease the inlet temperatures of the reactors can be raised which of course gives rise to further catalyst deactivation since the aging rate of the platinum metal catalysts increases exponentially with temperature.

The heat removed throughout the catalytic reforming reaction does not bear a simple relationship with increase in octane number. In a system employing three equal sized reactors each having an inlet temperature of about 920° F. to produce a product from the third reactor of 95 research octane number, from a straight run naphtha of 40 research octane number, the temperature in the first reactor drops 130° F. in the first 30 percent of the catalyst bed during an increase of 18 octane numbers and drops only 3° F. in the remainder of the bed during an increase of 12 octane numbers. Apparently, rapid dehydrogenation occurs in the first part of the bed whereas hydrocracking, an exothermic reaction, supplies enough heat to balance approximately the dehydrogenation reactions continuing at a reduced rate in the latter part of the first reactor bed. The second reactor shows the same effect except that the temperature drop in the first 30 percent of the bed is of lesser degree. The third reactor runs almost isothermally after dropping a few degrees below the inlet temperature. Due to these variations in bed temperatures, the average catalyst bed temperatures are greatly different from one another. Since most of the first reactor is at a comparatively low temperature level, the catalyst in its bed is deactivated very slowly. On the other hand, in the third reactor the temperature level remains high causing the catalyst to age rapidly. In time the catalyst activity in the last reactor becomes so low that it is no longer possible to make the 95 research octane number product even at the maximum reactor inlet temperature permissible, e. g. about 975° F., even though the catalyst in the first reactor may still have in the neighborhood of 90 percent of its virgin activity. Under these equal inlet temperature conditions this reaction system might continue to produce 95 research octane number product from the 40 research octane number charge for a period of about 110 days without employing reactivated catalyst if the inlet temperatures of the three reactors are raised as necessary to produce the 95 octane product and eventually reach about 975° F.

Due to the very high cost of the platinum metal catalyst, efficient use of the catalyst is of substantial economic importance. In the conventional three-reactor system described, the process would have to be shut down as soon as the third reactor catalyst bed reached the lowest permissible activity level. If this be done the catalyst beds of the first and second reactors still retain considerable activity and could of course have been used for additional days of processing. If the catalyst be a non-regenerative type the partially deactivated catalyst of the first and second reactors must be remade before maximum utility has been realized. Alternatively, portions of these beds could be mixed with virgin catalyst and reused but not without lowering the activity and potential processing utility of the virgin catalyst. Even if the catalyst be a regenerative type, the three catalyst beds would have to be regenerated as soon as the bed of the third reactor fell below the lowest permissible activity level, thus losing potential processing time of the catalyst of the first and second reactors. In this system regeneration occurs more frequently, thus increasing the number of days off-processing and increasing operating costs incurred through the more frequent regenerations.

In the present invention I have found that the platinum metal catalyst in a multiple adiabatic bed reforming system can be aged more uniformly, and the effective catalyst life can be increased providing the temperature of the feed passing to the separate reactors is varied. Essentially, the advantages of my invention are realized by passing the feed to the catalyst bed of a second reforming reactor at a temperature at least about 25° F. lower than the temperature of the feed passing to the caalyst bed in a first reactor. Thus in a two-reactor system the temperature of the feed to the first reactor may be held at about 975° F. with the feed to the second reactor over the major portion of the processing period ranging from about 900° to 950° F. The minimum inlet temperature of the feed to the second catalyst bed is about 850° F. As noted in order to keep the octane number of the product at its initial level, if that be desired, the inlet temperature of at least one of the reactors will be raised during processing. If the first reactor inlet temperature be initially below 975° F., e. g. 920° F., it can be raised as required to about 975° F. The second reactor inlet temperature might be raised independently or in conjunction with the inlet temperature of the first reactor with the minimum difference of about 25° F. between the inlet temperatures of the first and second reactors being maintained. When the inlet temperature of the feed of the second reactor reaches about 950° F., the inlet temperature of the first reactor will be 975° F. Accordingly, the inlet temperature of the first reactor will remain at this level and the second reactor inlet temperature will be raised towards 975° F. if the octane number of the product be maintained as the activity of the catalyst decreases during processing. Of course during the passage of the second reactor inlet temperatures from about 950 to about 975° F., the desirable 25° differential in inlet temperatures will not be maintained. However, since the period in which this temperature differential will not be maintained usually represents only a minor part of the total processing period, substantial advantage in terms of uniform catalyst aging characteristics and longer processing periods will still be realized from previous maintenance of the differential.

My invention can be employed in any reforming system employing a platinum metal catalyst and a plurality of adiabatic catalyst beds. For instance, in addition to the two-reactor system described, I employ as a preferred procedure a system embodying in series three adiabatic reactors with a heater before each reactor connected to receive with the effluent from each previous reactor passing to the next subsequent reactor. Less than three reactors can be used, however, this requires an excessive quantity of catalyst for a given catalyst life. Furthermore, it is less possible to age the catalyst uniformly as the number of reactors decreases. Although a system employing four or more reactors can be utilized, the lower catalyst consumption obtainable with more than three reactors and the more uniform catalyst aging characteristics might not justify the increase in capital and plant complexity under present economic conditions. The endothermic nature of catalytic reforming with the platinum metal catalyst and the variation of the catalyst aging rate with temperatures at the desirable pressure and gas recycle ratio impose these limitations. When employing more than two reactors, the feeds to the subsequent reactors, e. g. the third reactor, are most advantageously at least about 25° F. below the inlet temperature of the immediately preceding reactor. The minimum inlet temperature for the third and subsequent reactors is about 825° F. Of course when the immediately preceding reactor has reached the peak temperature of about 975° F. and the next subsequent reactor is raised to about 950° F. to maintain the octane level of the product, the 25° F. differential cannot be maintained during this part of the processing period.

Substantial advantages can be realized from my process if the second reactor inlet temperature is at least about 25° F. lower than that of the first reactor regardless of the inlet temperature of the third or subsequent reactors as long as the inlet temperature of each of the latter reactors is not above about 95° F. Most likely, if the operator chooses not to keep the preferred 25° F. or more inlet temperature differential between each reactor, he will not choose to operate the reactor subsequent in line to the second reactor at an inlet temperature substantially higher than that of the second reactor.

In Table I are listed data to show the advantage in employing my reforming system utilizing varying or unequal reactor inlet temperatures as compared with the conventional system in which the reactor inlet temperatures are equal. The feed employed is a straight run Near East naphtha which is contacted with a regenerable platinum-alumina catalyst (0.6% platinum) to produce 95 research octane number neat stabilized reformate. The processing conditions in the separate systems are identical except as noted in the table and they are 500 p. s. i. g., 7 to 1 molal ratio of recycle gas to hydrocarbon, and 2.0 WHSV (weight of feed per weight of catalyst per hour). The processing system is composed of three adiabatic reactors containing equal sized catalyst beds.

Table I

| Temperature Pattern (3 reactors) | Length of Processing, days |
| --- | --- |
| Equal inlet temperatures to all reactors, 920–975° F. | 110 |
| Reactor No. 1 at 975° F. initially<br>Reactors Nos. 2 and 3 at 915° F. initially | 120 |
| Reactor No. 1 at 975° F. initially<br>Reactor No. 2 at 940° F. initially<br>Reactor No. 3 at 890° F. initially | 125 |

In the systems of Table I the 95 octane level is maintained by varying the temperature; for instance in the equal inlet temperature system the initial temperatures of all reactors were 920° F. and the final temperatures were 975° F. In the second case since reactor No. 1 started at the top temperature of 975° F. the octane was maintained by raising the inlet temperatures of reactors Nos. 2 and 3 together from the initial 915° F. It takes about 95 days for these temperatures to reach 950° F. and the remainder of the processing period was afforded while the inlet temperatures of reactors Nos. 2 and 3 were brought to the final temperature of 975° F. In case three of the table, the octane was maintained by raising the inlet temperatures of reactors Nos. 2 and 3 to the final temperature of 975° F. while maintaining a 50° spread between the inlet temperatures. It takes about 100 days before the inlet temperature of reactor No. 2 reaches 975° F. and then the remainder of the processing period is afforded by raising the inlet temperature of reactor No. 3 to 975° F. From the data of Table I the advantage afforded by employing unequal inlet temperatures according to the present invention is apparent.

The following specific example further illustrates the present invention; however, it is not to be considered limiting. Referring to the drawing, the reforming system is defined by three adiabatic reactors 1, 2 and 3 containing equal sized catalyst beds. The total straight run naphtha charge passes first through line 4 to feed preheater 5 and then through line 6 to reactor 1. The effluent from the first reactor is passed through line 7 to reheater 8, reheated, and passed through line 9 to reactor 2 while the effluent from the second reactor is passed through line 10 to reheater 11, reheated, and then passed through line 12 to reactor 3. The products from the third reactor are passed through line 13 to a flash drum 14 where recycle gases pass overhead through line 15 to feed line 4 and reformate is withdrawn as bottoms product through line 16. The reformate is then stabilized in the re-run tower. Each of the reactors is maintained under 500 p. s. i. g. pressure and hydrogen gas from the flash drum is recycled in the ratio of 7 moles of gas per mole of naphtha feed. The recycled gas contains 75 mole percent of hydrogen. In each reactor there is provided a bed of regenerable platinum-alumina reforming catalyst containing about 0.6 percent of platinum and naphtha feed is charged at 2.0 WHSV. 16,000 barrels per day of Middle East straight run naphtha, 29.0 research octane number neat, 54.0° API gravity, 233–254° F. ASTM boiling range are passed to the preheater. The feed to the first reactor enters at 975° F. while the effluents from the first and second reactors are reheated to 915° F. before passing, respectively, to the second and third reactors. During the processing period the inlet temperatures of reactors Nos. 2 and 3 are raised together gradually to 975° F. as necessary to maintain the stabilized reformate at 95 research octane number neat. It takes 95 days before the inlet temperatures of reactors Nos. 2 and 3 reach 950° F. The product from the flash drum is 12,300 barrels per day of stabilized reformate of 95 research octane number neat. The overall processing period is 120 days.

As a further aspect of my present invention, I have found that the use of catalyst beds increasing in size from the first to the second to the third, etc., in combination with variation of the inlet temperatures as previously described affords additional processing advantages in terms of uniform catalyst aging characteristics and catalyst life. In one arrangement, the catalyst bed in the first reactor is smaller than the catalyst bed in the second reactor. However, the catalyst beds of the second and third reactors may be of equal size or preferably the bed of the second reactor is smaller than that of the third reactor. In a system employing four reactors in series, the reactor beds may become increasingly larger according to their position in the series or merely the first reactor bed is smaller than the second, third and fourth reactor beds. Of course, the second and third beds can be equally sized and larger than the first bed with the fourth being larger than either the second or third beds.

In a reforming system operating identically to that of Table I except that the three reactor beds are of relative sizes 1, 2 and 12, respectively, the following results are obtained. In this system, if equal reactor inlet temperatures be maintained during the processing period, the processing period lasts 160 days, as the temperatures pass from 920° to 975° F. to maintain the 95 octane product. If the initial inlet temperatures of these reactors be 975° F., 930° F. and 910° F., respectively, and the 20° F. spread be maintained while the inlet temperatures of reactors Nos. 2 and 3 are raised to produce the 95 octane reformate, the overall processing period lasts 175 days. It is 140 days before the temperature of reactor No. 2 reaches 975° F.

The catalysts employed in my invention are the platinum metal reforming catalysts. Generally, these catalysts comprise about 0.1 to 1 percent by weight of platinum metal on an alumina base. Several of such catalysts are well known, and they include those which contain promoters such as the acidic promoters chlorine, fluorine and silica. The platinum metal of the catalyst is the essential active component, and these metals include patinum, ruthenium, rhodium, palladium, iridium and osmium. The preferred metal is platinum. Catalysts bases other than alumina may also be employed.

The catalyst beds of the several reactors are preferably the fixed bed type. The reactors are connected in series and between each is a reheater for heating the effluent of the previous reactor to the desired inlet temperature of the reactor following the reheater. A preheater is disposed in the feed line before the first reactor to heat the feed to the inlet temperature of the first reactor. The space velocity through the reactor system is from about 1 to 8 WHSV (weight of feed per weight of catalyst per hour) and is generally varied to regulate severity. Hydrogen gas is supplied to each reactor usually in an amount from about 2 to 10 moles of hydrogen per mole of hydrocarbon feed. The hydrogen is usually recycle gas from the reactors. The pressure in the reaction zone is elevated and generally can vary from about 150 to 1000 pounds per square inch. My hydrocarbon feeds are the conventional substantially olefin-free reforming feed stocks boiling in the naphtha and gasoline ranges. These stocks include relatively pure stocks such as cyclohexane and methylcyclohexane.

I claim:

1. In the reforming of substantially olefin-free hydrocarbons of gasoline and naphtha boiling ranges in the presence of hydrogen and a platinum metal reforming catalyst and employing in series platinum metal catalyst beds maintained under reforming conditions in a plurality of adiabatic reaction zones and employing a heating zone before each of the plurality of reaction zones, the steps comprising heating the hydrocarbon feed, passing the heated feed to a reaction zone at an inlet temperature from about 875 to 975° F., heating the effluent from a reaction zone and passing the heated effluent to a subsequent reaction zone at an inlet temperature of at least about 25° below the inlet temperature of a preceding reaction zone.

2. The method of claim 1 in which the platinum metal is platinum.

3. The method of claim 1 in which the catalyst bed of the subsequent reaction zone is larger than that in a ceding reaction zone.

4. In the reforming of substantially olefin-free hydrocarbons of gasoline and naphtha boiling ranges in the presence of hydrogen and a platinum metal reforming catalyst and employing in series platinum metal catalyst beds maintained under reforming conditions in three adiabatic reaction zones and employing a heating zone before each of the three reaction zones, the steps comprising heating the hydrocarbon feed, passing the heated feed to a reaction zone at an inlet temperature from about 875 to 975° F., heating the resulting effluent and passing it to a subsequent reaction zone at an inlet temperature of at least about 25° below the inlet temperature of the preceding reaction zone, heating the resulting effluent and passing it to a subsequent reaction zone at an inlet temperature of at least about 25° below the inlet temperature of the preceding reaction zone.

5. The method of claim 4 in which the platinum metal is platinum.

References Cited in the file of this patent

UNITED STATES PATENTS

| | | |
|---|---|---|
| 2,645,604 | Clark | July 14, 1953 |
| 2,654,694 | Berger et al. | Oct. 6, 1953 |
| 2,664,386 | Haensel | Dec. 29, 1953 |